UNITED STATES PATENT OFFICE.

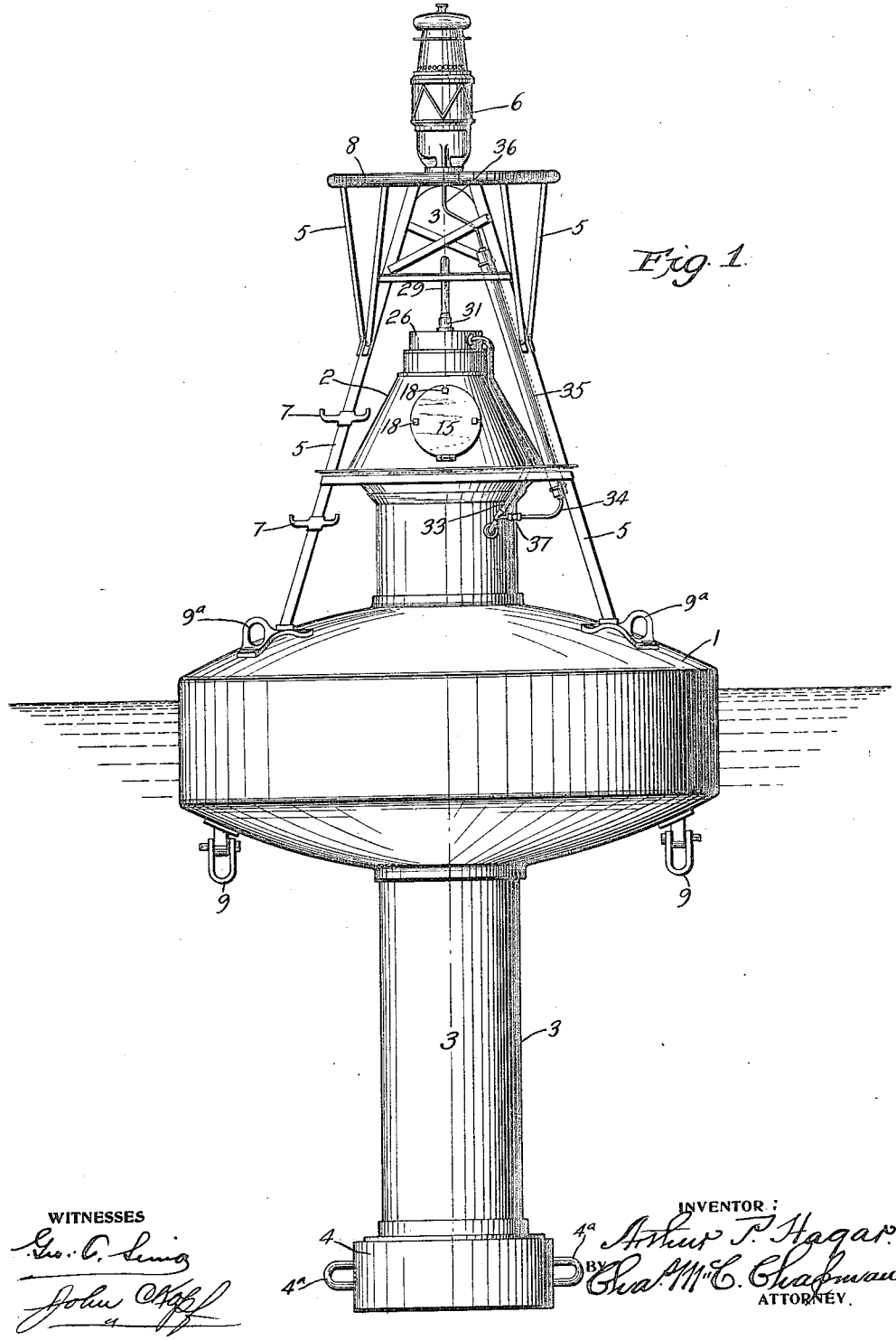

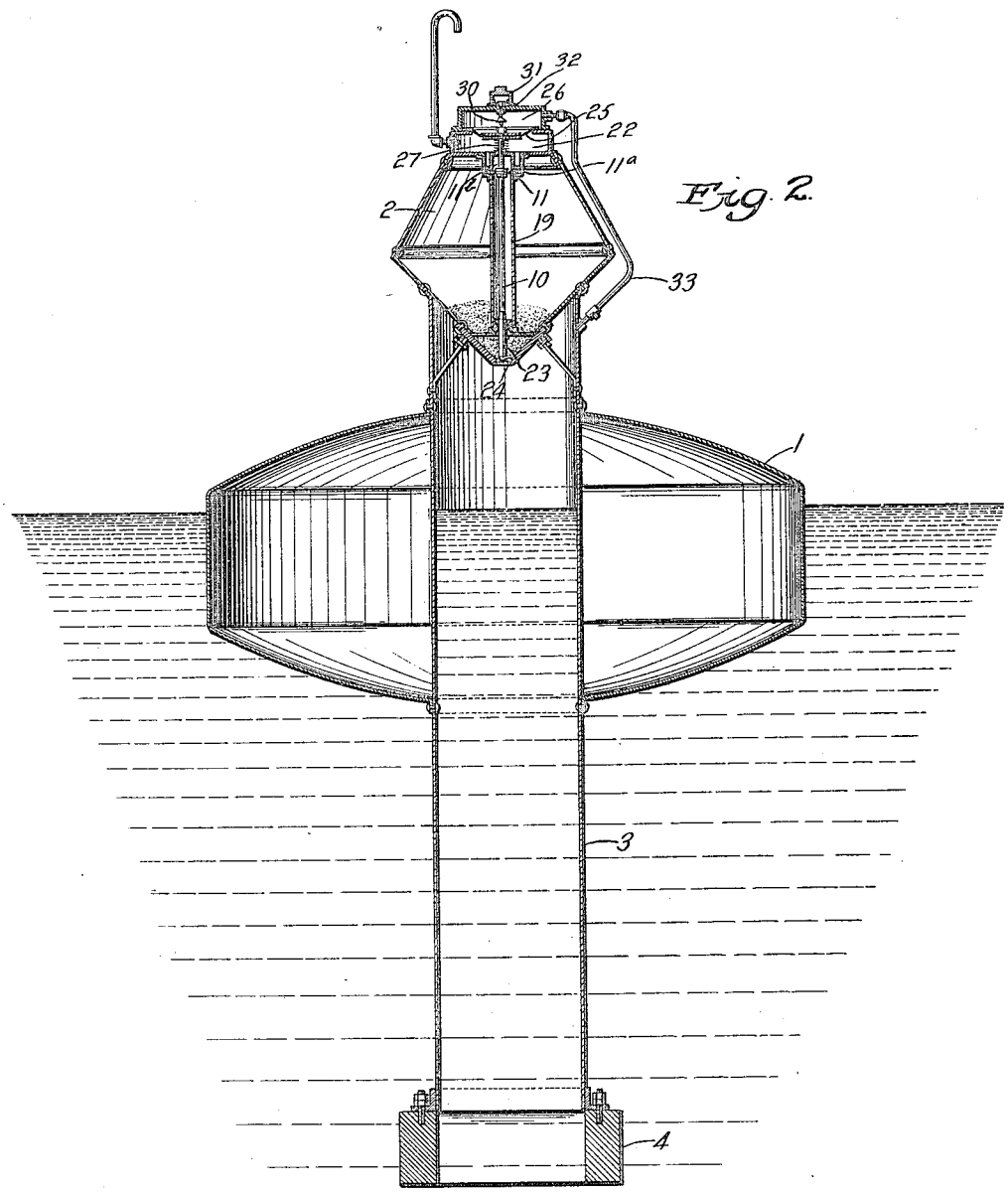

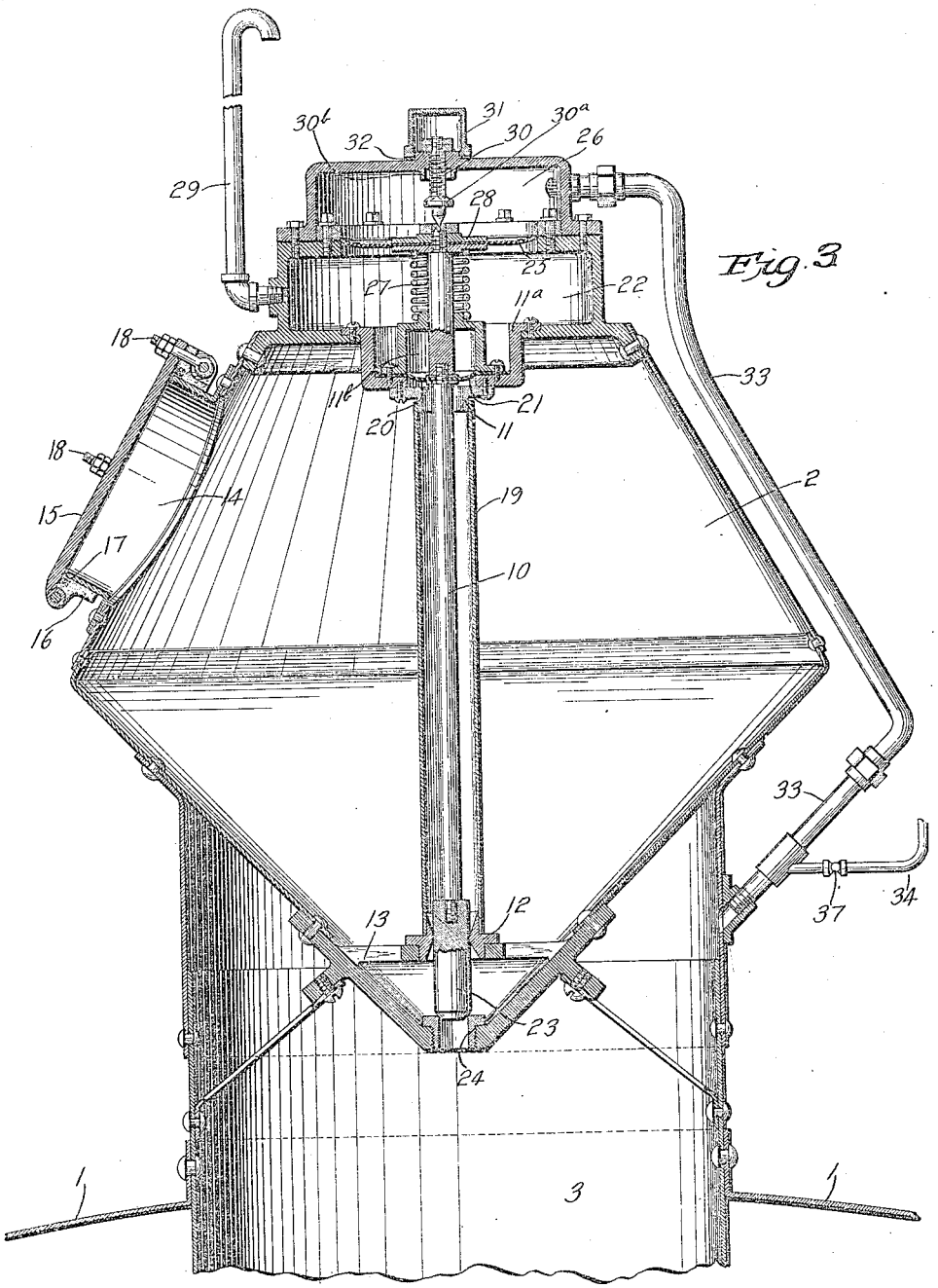

ARTHUR P. HAGAR, OF NEWARK, NEW JERSEY, ASSIGNOR TO SAFETY CAR HEATING & LIGHTING COMPANY, A CORPORATION OF NEW JERSEY.

ACETYLENE-GENERATOR.

1,225,434.

Specification of Letters Patent.

Patented May 8, 1917.

Application filed December 19, 1912. Serial No. 737,610.

*To all whom it may concern:*

Be it known that I, ARTHUR P. HAGAR, a citizen of the United States, residing in Newark, county of Essex, and State of New Jersey, have invented a new and useful Improvement in Acetylene-Generators, of which the following is a description.

My invention relates to acetylene generators, and in its present form is designed particularly for use in connection with buoys or floats and is constructed to give a continuous light for a long period.

Among the objects of my invention may be noted the following: to provide a generator capable of receiving a very large quantity of granulated or finely powdered calcium carbid and supplying the same under automatic control; to provide a generator having a feeding mechanism capable of controlling the supply of carbid according to the requirements in use; to provide a generator with a means for feeding carbid into a generating chamber having a constant or continuous supply of water; to provide a generator with an automatic carbid feeding mechanism and means by which the sludge is automatically disposed of; to provide a buoyant generator capable of automatically generating the gas, automatically regulating such generation, and automatically disposing of the sludge formed during such generation; and to provide a strong, durable, simple and effective apparatus capable of effecting the objects above pointed out, and which is not liable to get out of order nor have any of its parts deranged.

With the above objects in view and others which will be detailed during the course of this description, my invention consists in the parts, features, elements and combinations of elements and mechanisms hereinafter described and claimed.

In order that my invention may be fully understood, I have provided drawings wherein:

Figure 1 shows, in side elevation, a buoy complete with my improvements applied thereto;

Fig. 2 is a vertical, central, sectional view of the structure of Fig. 1, the lamp-tower or superstructure being omitted; and Fig. 3 is an enlarged, central, vertical section of the operative parts of my invention taken substantially on the line 3—3 of Fig. 1.

Referring to the drawings, 1 indicates the float which may be of any usual form, and 2 the carbid-chamber located above and attached to the float in its longitudinal axial line, 3 being the generating chamber or tube, the axial line of which coincides with that of the carbid-chamber and of the float. The generating chamber is entirely open at its lower end and may be of any length desired to suit conditions of use. By having the chamber 3 open at the bottom it will discharge the sludge as fast as the gas from the carbid is generated, and a constant supply of water is provided. 4 is a counter-weight at the bottom of the generating-chamber or tube designed to hold it in vertical position in the usual way. 5 indicates the parts of a latticed tower or superstructure secured to the top of the float 1 and sustaining a lamp or burner 6. This tower is provided with steps 7 and a ring 8 at its top, secured as shown to the upper portion of the lattice work, for aiding an attendant to reach the lamp. The float 1 is provided with mooring attachments 9 and lifting eyes $9^a$, and the counter-weight 4 is provided with lifting eyes $4^a$. See Fig. 1. The carbid-chamber 2 is preferably of double conoidal form, see Figs. 2 and 3, and is provided at its axial center with a separable or two-part valve rod 10 which is held in the axial center of the chamber by hollow fittings, 11, $11^a$ and $11^b$, at the top and 12 at the bottom, the latter being sustained by a spider 13 which is secured within the bottom of the chamber as shown. The carbid chamber 2 is provided with a charging man-hole 14, closed by a hinged door 15, door-frame 16 being provided with a gasket 17 and locking-bolts 18, coöperating with the door to render the latter gas tight.

The valve-rod 10 is surrounded by a protecting tube 19 which is supported by the top and bottom fittings; and the two parts of this valve rod are screw-threaded together at 20 and clamp between them a flexible diaphragm 21 which is secured at its periphery between the flanges of the two upper fittings $11^a$ and $11^b$. This diaphragm prevents gas which may accumulate in the carbid chamber 2 from escaping through the valve protecting tube 19 into a vent chamber 22 and hence into a vent pipe 29 and the exterior atmosphere, thus assuring no waste. The lower end of the valve-rod is provided with a valve 23 coöperating with the seat 24 to control the passage of the carbid through the bottom of the carbid-chamber. To the upper end of the shorter portion of the valve-rod is secured a somewhat larger and stronger diaphragm 25, held at its periphery between the top of the chamber 22 and the bottom of a pressure-chamber 26. A coiled spring 27 surrounds the upper portion of the valve-rod and is designed to normally hold the valve 23 in its upper or open position. The lower end of said spring rests upon the hollow fitting 11$^b$ and the upper end bears against a diaphragm support 28. The chamber 22 is provided with an outlet-tube or vent-pipe 29 extending vertically therefrom and having its upper end overturned so as to prevent moisture or particles entering the same. A regulating stem 30 with a conical lower end is located in alinement with the valve stem and adapted to bear thereon, said stem being threaded into the top of the pressure-chamber; and to make the latter gas tight the stem has a conical portion 30$^a$ between its ends which coöperates with the seat 30$^b$ in the top of chamber 26. In addition a cap 31 is screwed on the top of said chamber over said stem with a washer 32 between them.

The generating chamber or tube 3 has near its upper end a pipe 33 which is connected directly with the regulating or pressure chamber 26. A conduit or supply pipe 34 is connected at one end directly to the pipe 33 and at its other end to a purifier 35, of any suitable form, which latter is in turn connected at its upper end to the burner in the lamp 6 by a pipe 36, see Fig. 1. The purifier is firmly secured in any suitable manner to one of the legs 5 of the superstructure. The pipe 34 has a three-way cock 37 located suitably therein for controlling the action of the device.

Mechanical features of construction of the apparatus have not been set forth in detail, since it is apparent that the number of parts, the manner in which they are secured together, and the precise way in which they are combined to secure their functions is not necessarily of the essence of my invention, the important features and combinative arrangement of parts for the important functions noted being, however, set forth in the foregoing description and shown in the drawings.

The mode of operation will now be understood from the following: Before charging the apparatus the feed-valve is closed by screwing down the regulating stem 30, Fig. 3, which will depress the valve-rod 10, compress the spring 27, flex the diaphragms 25 and 21, and cause the valve 23 to become firmly seated at 24, thus preventing feed of the carbid to the generating chamber 3. The door 15 is then opened and the desired amount of carbid placed in the chamber 2.

When a proper charge has thus been placed in the chamber, the door is closed and secured tightly in place against the gasket 17 by the bolts 18, thus insuring the necessary seal. The three-way cock 37 is then opened to the atmosphere and the air compressed in the generating chamber 3, by reason of the pressure of the water from below and the weight of the buoy, is allowed to escape. After the air has ceased to flow, the valve 23 is allowed to open by unscrewing the regulating stem 30, until its conical portion 30$^a$ is firmly seated at 30$^b$, the spring 27 thus assuming control of the valve rod 10 and lifting the same and the valve 23 from the seat 24, the spring acting upon the diaphragm holder 28, thus also flexing the diaphragm 25 upwardly so as to hold the valve open until adverse pressure is brought to bear upon the diaphragm 25 as presently described. The conical portion 30$^a$ on stem 30, when seated as described, prevents any loss of gas into cap 31. The valve now being open, the carbid drops into the water in the generating chamber 3, whereupon acetylene gas is generated. Since the carbid descends a considerable distance into a large body of water, gas generation is rapid and is completed before the resulting sludge passes through the bottom of chamber 3. With the cock 37 still open to the atmosphere, gas is allowed to escape until the air is all out of the generating chamber and the gas therein is sufficiently pure to give the desired light. As soon as the escaping gas has the desired acetylene or rich odor, the cock 37 is turned so that the gas will pass by the pipe 34 into the purifier 35 and thence to the lamp 6 by the pipe 36. The gas is then lighted and continues to burn, under automatic regulation, until the supply of carbid in the chamber 2 is exhausted. As the pressure rises in the generating chamber, this pressure is communicated to the regulating or pressure chamber 26 through pipe 33 where, when the power of the spring 27 is overcome, the pressure will depress the diaphragm 25 which in turn will depress the valve-rod 10 and thus close the valve head 23 upon its seat. The spring is selected with reference to the predetermined pressure desired in pressure chamber 26 to operate upon the diaphragm to close the valve 23, and this pressure is, preferably, two pounds per square inch, but may be any other desired amount, depending upon the length or size of the tube 3. When the valve is thus closed, the feed of carbid is automatically stopped; but, is automatically resumed when the pressure in chamber 26 is relieved to the necessary extent by consumption of gas in the lamp 6. As the gas continues to burn in the lamp, the pressure is reduced in the regulating chamber and the spring 27 is thus allowed to lift the valve, whereupon the feed of carbid in regulated amount is resumed. This automatic operation continues until the carbid is exhausted from chamber 2.

It will be noted that the gas which is generated in chamber 3 is conducted to pressure chamber 26 outside of or around the carbid chamber 2, thus insuring the carbid in said chamber being kept free from all moisture and preventing "after generation."

It will also be understood that this invention is directed broadly to the automatic operation of a single feeding valve 23, influenced by variable pressure in the generating-chamber 3 and the pressure-chamber 26, which is dependent upon the pressure of the water upward in the generating-chamber 3 and the counter pressure due to the gas entering the pressure-chamber 26, which, as before described, is connected directly to said generating chamber by an exterior pipe 33. In other words, this variable or double pressure-effect is differential in its nature and is dependent upon the length of the generating-chamber 3 and the strength of the coiled spring 27, adapted normally to hold the valve 23 open against a predetermined pressure in chamber 26, it being understood, as before stated, that the valve is primarily closed by turning the regulating stem 30 to the right to its limit, so as to hold the spring 27 under compression.

My invention is not limited to the special form of apparatus disclosed in the accompanying drawings, nor to its special use with floating buoys. It is obvious that a number of the features thereof may be applied to many illuminating and heating gas-generators in which the material to be acted upon produces gas through the action of water or other liquids, and I desire it understood that my claims in this respect are of the most generic nature, being directed, among other things, to an automatic regulator which acts differentially to alternately feed a granular or powdered material, as carbid, and to discontinue the feed thereof by means of the pressure of the gas or fluid generated. In fact, I desire to lay stress upon the idea of means of automatically relieving the pressure of the gas generated, and simultaneously stopping the generation of the gas or, conversely, automatically generating gas as pressure is reduced; also upon the idea of means of providing for the continuous generation of gas under automatic control of its own pressure; also upon the idea of means of an apparatus which can produce its own gas and control and regulate its gas generation; also upon the idea of means of keeping the material, from which the gas is generated, free from moisture by conducting the gas around, instead of through, the pressure chamber 2; and also upon the idea of means of generating gas from a substance which, as the gas is produced, is automatically exhausted or carried away from the apparatus, thus avoiding the necessity for cleaning out the latter.

Having thus described my invention, what I claim and desire to secure by Letters Patent is:

1. A gas generator having, in combination, a holding chamber provided with an opening in its bottom; a floating generating chamber arranged below the holding chamber and having its entire bottom open and unobstructed to the admission and emission of water, the opening in the bottom of the holding chamber enabling communication of the latter with the generating chamber; a valve for controlling the opening between the two chambers and the passage of material from the holding chamber into the generating chamber; means for normally holding the valve open against a predetermined pressure; and means for closing the valve against the action of its holding means controlled by the pressure of the gas generated.

2. A gas generating buoy comprising a float; a holding chamber mounted upon the float; a generating chamber carried by the float and extending from the latter into the water and to the holding chamber, said generating chamber being entirely open at its bottom and unobstructed to the admission and emission of water; a valve between the holding chamber and the generating chamber; means for automatically opening said valve and maintaining it thus against a predetermined pressure; and pressure actuated means for closing said valve.

3. A generator comprising a chamber for holding the material from which the gas is produced; a generating chamber having its entire bottom open and unobstructed to the admission and emission of water, said chamber being located below the holding chamber and having operative connection therewith; means controlled by the pressure of gas in the generating chamber for regulating the flow of the material into said generating chamber; means for utilizing the gas; a conduit connecting the generating chamber with the gas-utilizing means; and a float for supporting the entire structure upon the surface of a body of water.

4. A gas generator comprising a chamber for holding a powder of the material from which the gas is produced; a generating chamber located below the first-named chamber and having operative connection therewith, said generating chamber having its entire bottom open and unobstructed to the admission and emission of water; means controlled by the pressure of gas in the generating chamber for regulating and discontinuing the flow of the powder; means opposing the action of the controlling means for continuing the flow of the powder; means for utilizing the gas; a conduit connecting the generating chamber with the gas-utilizing means; a purifier connected to said conduit; and a float for supporting the entire structure upon the surface of a body of water.

5. A generator of a combustible gas comprising a chamber for holding the material from which the gas is produced; a generating chamber arranged adjacent the first-named chamber and having its entire bottom open for the admission and emission of water; means for feeding the material from one to the other chamber; means controlled by the pressure of the gas generated for regulating the feed of the generating material; means for utilizing the gas; a conduit connecting the generating chamber with the gas-utilizing means; means for supporting all of said parts on a body of water with the generating chamber extending into the latter so that the united weight of the structure and the opposing pressure of the water in the generating chamber shall produce the gas pressure and automatically effect its regulation as used.

6. An acetylene gas generator having a chamber for holding the carbid; a generating chamber located below said carbid chamber; a valve mechanism for admitting the carbid into the generating chamber; a controller for the valve for regulating the feed of the carbid, including a pressure chamber located above the valve and sealed against the holding chamber; a flexible diaphragm connected with the valve for closing the lower end of the pressure chamber; a conduit connecting the generating chamber directly with the pressure chamber; and a second conduit for connecting the generating chamber directly with a means for utilizing the gas, substantially as described.

7. A gas generator comprising a carbid holder; a generating chamber; a valve opening forming a communication between the two chambers, the entire bottom of the generating chamber being open and unobstructed for the admission and emission of water; a valve for closing the said passage; a pressure chamber located above the holding chamber, the bottom of said pressure chamber being composed of a flexible diaphragm; connections between the valve and said diaphragm, whereby the former may be operated by the latter; primary means for normally holding the valve open; and means of communication between the pressure chamber and the generating chamber, whereby excess of pressure in the generating chamber may effect pressure in the pressure chamber to control the operation of the valve in opposition to its primary controlling means.

In testimony whereof I have hereunto signed my name in the presence of two subscribing witnesses.

ARTHUR P. HAGAR.

Witnesses:
 CHAS. McC. CHAPMAN,
 M. HERSKOVITZ.

Copies of this patent may be obtained for five cents each, by addressing the "Commissioner of Patents, Washington, D. C."